United States Patent [19]

Reum

[11] Patent Number: 5,301,187

[45] Date of Patent: Apr. 5, 1994

[54] SYSTEM FOR IMPLEMENTING BROADBAND AUDIO PROGRAM TELEPHONY CIRCUITS USING 2B1Q TECHNOLOGY

[75] Inventor: Peter M. Reum, Littleton, Colo.

[73] Assignee: XEL Communications, Inc., Aurora, Colo.

[21] Appl. No.: 66,973

[22] Filed: May 25, 1993

[51] Int. Cl.$^5$ .............................. H04B 1/40; H04J 3/00
[52] U.S. Cl. .............................. 370/24; 370/110.1; 375/17
[58] Field of Search .............. 370/24, 26, 69.1, 71, 370/73, 75, 76, 110.1; 375/7, 8, 17, 25, 54

[56] References Cited

U.S. PATENT DOCUMENTS

| | | | |
|---|---|---|---|
| 4,277,647 | 7/1981 | Brolin et al. | 370/71 |
| 4,586,174 | 4/1986 | Wong | 370/69.1 |
| 4,896,334 | 1/1990 | Sayar | 375/20 |
| 4,896,335 | 1/1990 | Wong et al. | 375/59 |
| 4,912,725 | 3/1990 | Hulth | 375/14 |
| 4,924,492 | 5/1990 | Gitlin et al. | 370/76 |
| 4,926,472 | 5/1990 | Batruni et al. | 379/411 |
| 4,964,118 | 10/1990 | Aly et al. | 370/32.1 |

*Primary Examiner*—Benedict V. Safourek
*Attorney, Agent, or Firm*—Dorr, Carson, Sloan & Peterson

[57] ABSTRACT

A two-way broadband audio telephone communications system using 2B1Q line coding between a program amplifier located at a remote site and the central office. The program amplifier includes a codec to convert analog audio signals to digital data at a predetermined sampling rate, and a 2B1Q transceiver to convert the digital data into 2B1Q signals. The program amplifier communicates with a channel unit in the central office channel bank over a conventional two-wire link. This channel unit includes a 2B1Q transceiver that translates the 2B1Q signals received from the program amplifier into PCM format compatible with the T1 carrier system. In order to provide wide bandwidth, the channel unit is allocated at least two channels in each T1 frame. The central office channel bank can communicate with any other similarly equipped channel bank over the T1 carrier. For example, at the other end of the T1 carrier, a second central office channel bank includes channel unit with a 2B1Q transceiver that converts the T1 data from the corresponding channels in each frame into 2B1Q format. The second central office communicates these 2B1Q signals over a two-wire link with a second program amplifier having a 2B1Q transceiver and a codec for two-way conversion into analog audio signals.

18 Claims, 6 Drawing Sheets

SYSTEM FOR IMPLEMENTING BROADBAND AUDIO PROGRAM TELEPHONY CIRCUITS USING 2B1Q TECHNOLOGY

BACKGROUND OF THE INVENTION

1. Field of the Invention

The present invention relates generally to the field of telephone communications. More specifically, the present invention discloses a system for providing broadband audio program telephony circuits using 2B1Q technology.

2. Statement of the Problem

2B1Q line coding is an analog modulation technique for transmitting data over telephone lines. For example, this modulation technique has been selected to implement the U-interface in the ISDN standard. Using 2B1Q coding, binary data bits are grouped in pairs. Each pair is then transmitted as a quaternary symbol, the magnitude of which may be one out of four equally spaced voltage levels (−3, −1, +1, or +3). The quaternary symbols are transmitted at half the rate of the binary sequence. Therefore, an incoming binary stream with a bit rate of 160 kbit/sec. is converted into a quaternary stream with a symbol rate of 80 kbit/sec. An example of 2B1Q line coding is shown in FIG. 5. The 2B1Q modulation scheme is an important improvement over traditional analog transmission schemes which are significantly affected by circuit impairments that degrade normal analog transmission, such as impulse noise or cross-talk. The 2B1Q scheme utilizes integrated circuits that include transceiver circuits, echo cancellation, control circuitry, interface circuitry, and which provide for bi-directional transmission over a single pair of wires.

A number of systems using 2B1Q line coding have been invented in the past, including the following:

| Inventor | U.S. Pat. No. | Issue Date |
| --- | --- | --- |
| Wong, et al. | 4,896,335 | Jan. 23, 1990 |
| Sayar | 4,896,334 | Jan. 23, 1990 |
| Hulth | 4,912,725 | Mar. 27, 1990 |
| Batruni, et al. | 4,926,472 | May 15, 1990 |
| Aly, et al. | 4,964,118 | Oct. 16, 1990 |

Wong discloses a digital 2B1Q transmitter that utilizes a dual modulator to generate a 2B1Q coded output by summing two binary modulated vectors in a 2:1 weighting ratio, allowing one modulating envelope generator to drive the dual modulator. The modulating envelope is coded in a 1-bit pulse density modulation (PDM) format, permitting the use of simple gating functions in performing the modulation function.

Sayar discloses a method for timing recovery in a receiver for a loop interface of a digital data transmission system, using for example 2B1Q coding.

Hulth discloses an adaptive equalizer for a receiver in a data transmission system using 2B1Q coding.

Batruni, et al., disclose a signal processing technique for removing echo interference or distortion from a received 2B1Q coded signal.

Aly, et al., disclose a system for echo cancellation in ISDN systems using 2B1Q coding.

3. Solution to the Problem

None of the prior art references uncovered in the search show a telephone system for broadband audio programming using 2B1Q technology between the remote location and the first central office, and between the second central office and the base station. The 2B1Q signal is translated into the appropriate digital format (e.g. T1) for transmission on the carrier between the central offices. The system uses multiple channels in each frame transmitted on the T1 carrier system to provide wide bandwidth.

SUMMARY OF THE INVENTION

This invention provides a full-duplex broadband audio telephone communications system that offers flat frequency response using 2B1Q line coding between a program amplifier located at a remote site and the central office The program amplifier includes a codec to convert analog audio signals into digital data at a predetermined sampling rate, and a 2B1Q transceiver to convert the digital data into 2B1Q signals. The program amplifier communicates with a channel unit in the central office channel bank over a conventional two-wire link. This channel unit includes a 2B1Q transceiver that translates the 2B1Q signals received from the program amplifier into PCM data compatible with the T1 carrier system. In order to provide wide bandwidth, the channel unit is allocated at least two channels in each T1 frame. The central office channel bank can communicate with any other similarly equipped channel bank over the T1 carrier For example, at the other end of the T1 carrier, a second central office channel bank includes a similar channel unit with a 2B1Q transceiver that converts the T1 data from the corresponding channels in each frame into 2B1Q format. The second central office communicates these 2B1Q signals over a two-wire link with a second program amplifier having a 2B1Q transceiver and a codec for two-way conversion into analog audio signals.

A primary object of the present invention is to provide a telephone system for delivering broadband, full-duplex audio programming from a remote location over a conventional two-wire link.

Another object of the present invention is to provide a telephone system for delivering broadband audio programming that is not susceptible to most impairments common to analog systems.

Yet another object of the present invention is to provide a telephone system for delivering broadband audio programming that does not require gain or equalization adjustments.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
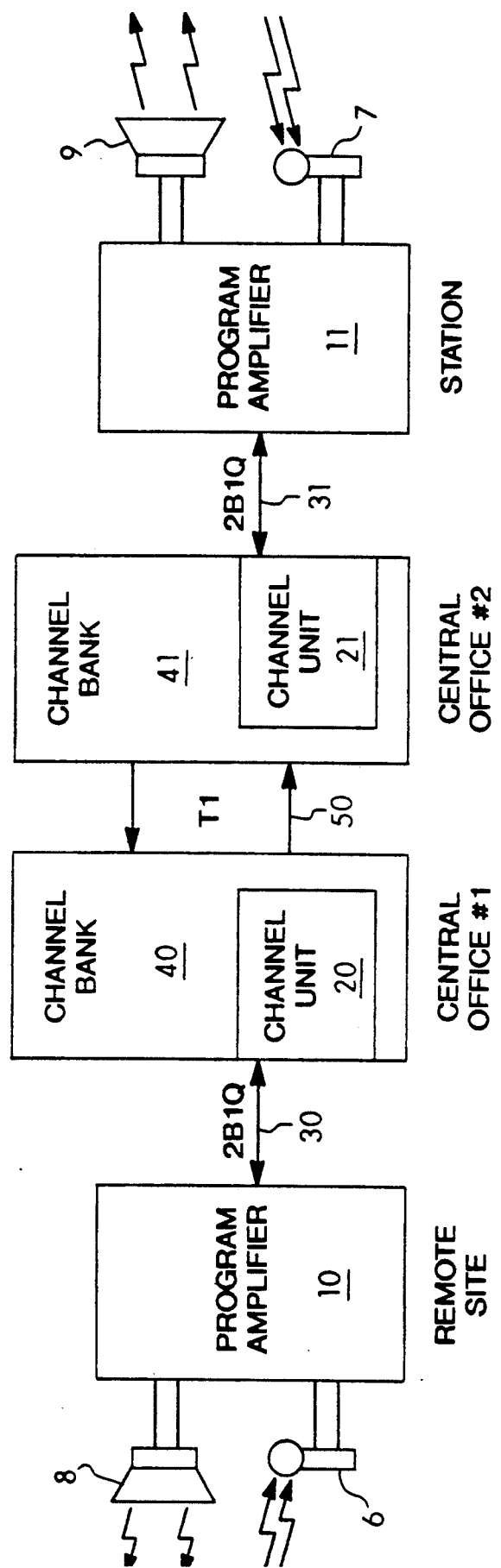
FIG. 1 is a schematic block diagram of the present invention.
Figure 4:
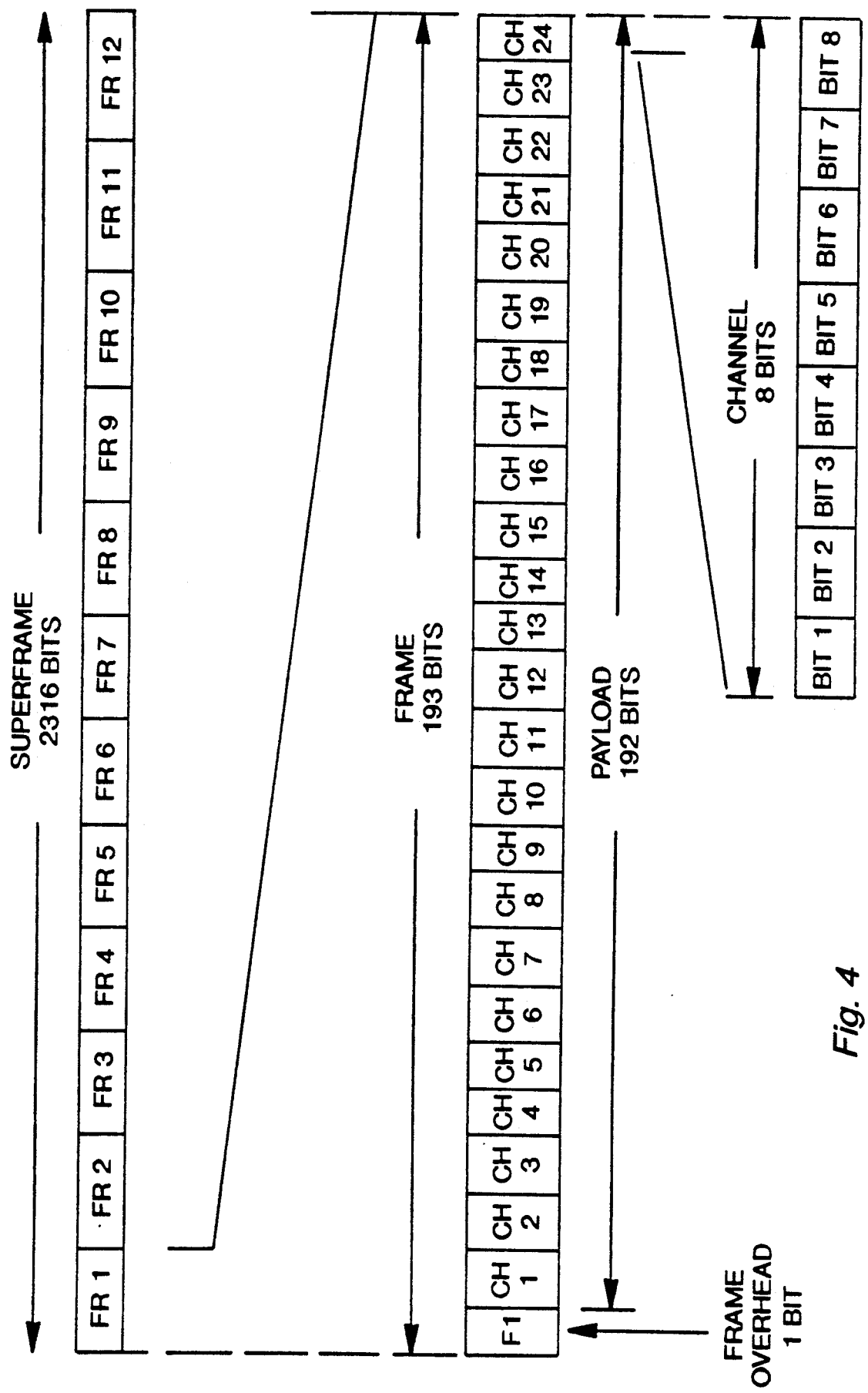
FIG. 4 is a diagram of the superframe bit sequence used in communication between the program amplifier and the channel unit.

Turning to FIG. 1, a schematic block diagram is provided of the overall system showing a typical implementation to communicate audio programming from a remote site to a station. As an overview, a program amplifier 10 located at the remote site is connected to a microphone 6 and a speaker 8 to receive and output audio programming. A similar, second program amplifier 11 is also equipped with a microphone 7 and speaker 9 to receive and output audio program at the station. Each program amplifier 10, 11 converts the analog audio signal to 2B1Q format and communications over a two-wire link 30, 31 with a channel unit 20, 21 associated with a central office channel bank 40, 41. The channel units 20, 21 each include a 2B1Q transceiver to convert the 2B1Q signals into T1 format. The channel banks 40, 41 communicate over a conventional T1 carrier 50. Digital data is transferred over the T1 link in the form of a series of frames divided into a plurality of channels, each of which contain a predetermined number of data bits. For example, FIG. 4 shows the conventional "superframe" structure used by D4 channel banks. Each superframe (2316 bits) contains 12 frames of 193 bits each. In turn, each frame contains 24 channels of 8 bits each, plus one frame overhead bit.

Figure 2:
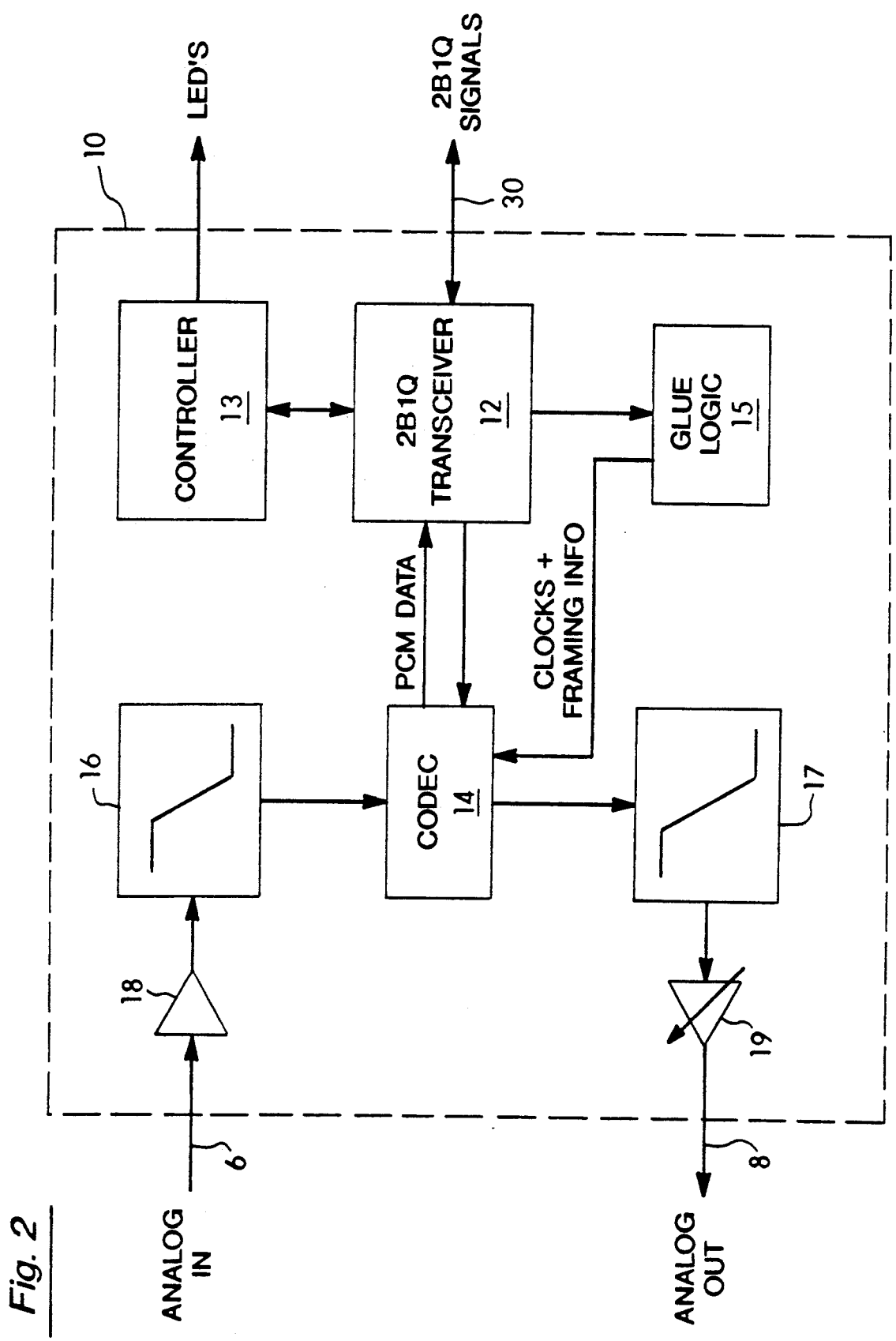
FIG. 2 is a schematic block diagram of a first embodiment of the program amplifier 10.
Figure 5:
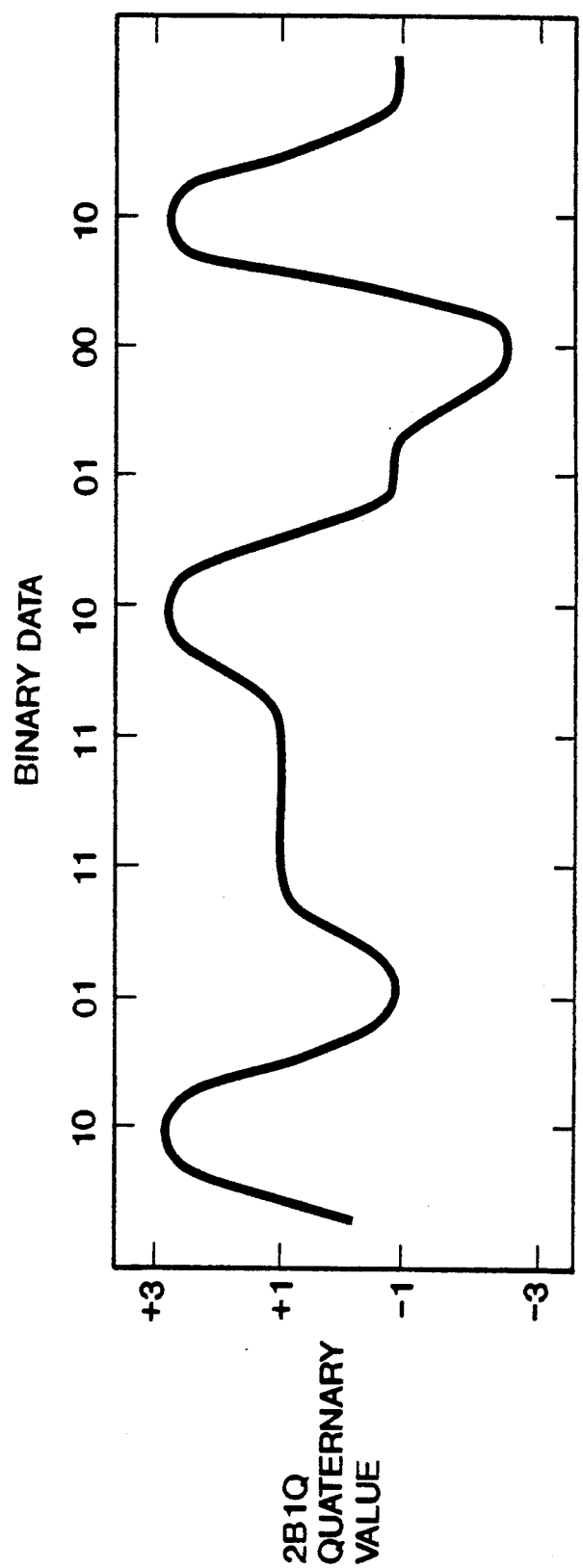
FIG. 5 is a diagram showing an example of 2B1Q line coding.

Embodiment for 50-7500 Hz Bandwidth. FIG. 2 provides a schematic block diagram of one embodiment of the program amplifier 10 (and 11) providing an audio bandwidth from approximately 50-7500 Hz. Analog signals from the microphone 6 pass through a fixed-gain amplifier 18 and a low-pass filter 16 with a flat frequency response to approximately 7500 Hz. A codec 14 provides two-way conversion of the analog signals into PCM (pulse code modulation) data. The 2B1Q transceiver 12 then converts the PCM data into 2B1Q signals that are transmitted over a conventional two-wire pair 30 to a channel bank 40 at a central office (e.g., Central Office #1 in FIG. 1). FIG. 5 shows an example of 2B1Q line coding performed by the 2B1Q transceiver. Timing and framing information are provided to the codec 14 by the 2B1Q transceiver 12 through glue logic 15. The framing signal to the codec 14 sets the sample rate. In the preferred embodiment, the sample rate is approximately 16 KHz.

2B1Q signals received by the transceiver 12 from the central office #1 are converted to PCM format and delivered to the codec 14. The codec 14 performs digital-to-analog conversion and the resulting analog signals pass through a low-pass filter 17 and an adjustable-gain amplifier 19 before being output to the speaker 8.

The program amplifier also includes a controller 13 (e.g., a microprocessor) to monitor and control operation of the program amplifier unit. The controller 13 uses a number of LED's to provide a visible indication of the status of the unit and any error conditions.

Figure 3:
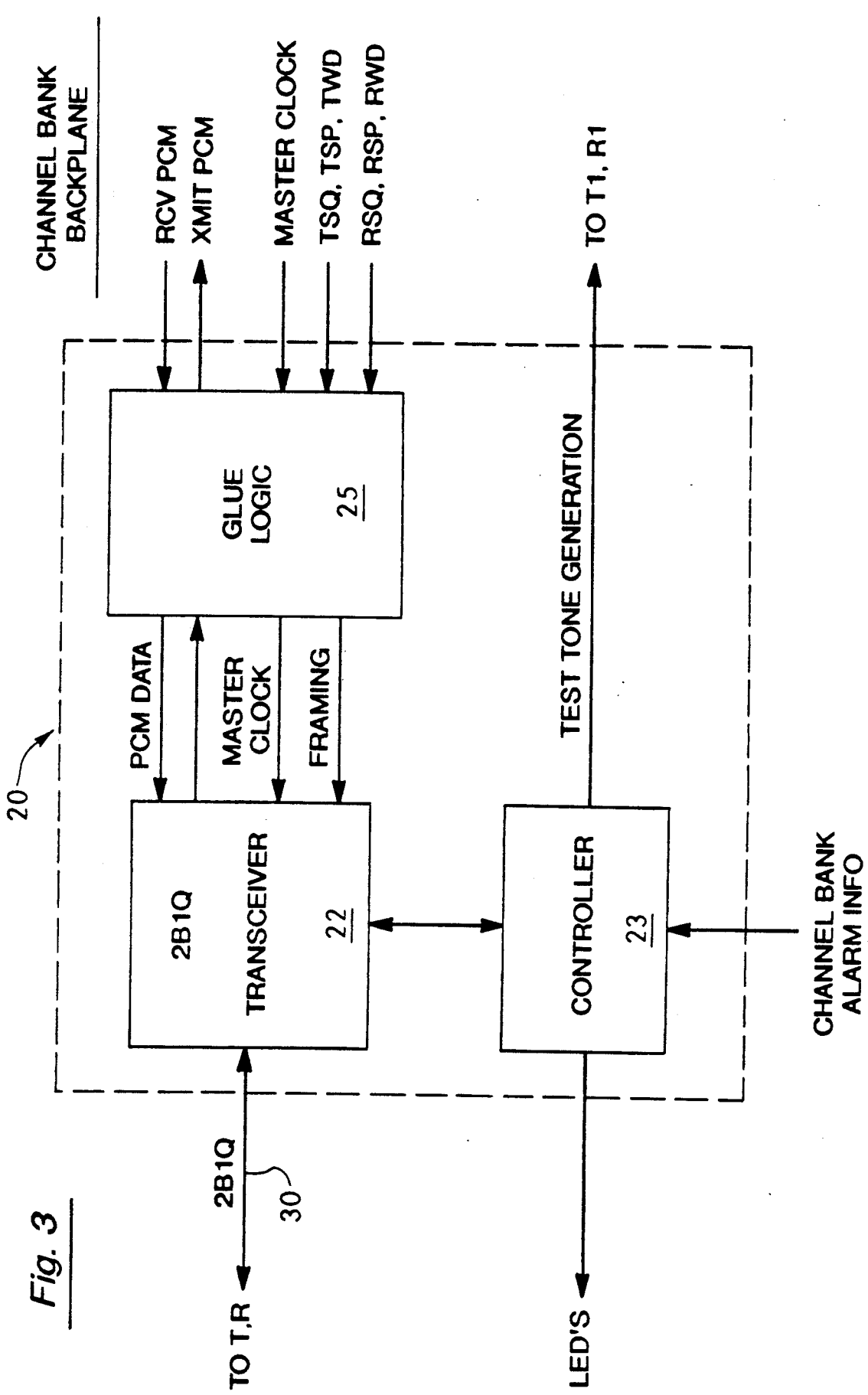
FIG. 3 is a schematic block diagram of the channel unit 20.

FIG. 3 is a schematic block diagram of the channel unit 20 (or 21). The channel unit 20 is one of a plurality of channel units that are inserted in slots in the backplane of a channel bank 40 (or 41). The channel bank (e.g. a D4 channel bank) accepts PCM data from each channel unit and time multiplexes this data into the channels in each frame transmitted over the T1 carrier. The transmission rate in a conventional T1 system is approximately 8,000 frames per second. In a conventional channel bank, one channel in each frame is assigned to each channel unit. Similarly, each frame received over the T1 carrier is demultiplexed and the data contained in each channel is received by the appropriate channel unit. The present system alters this conventional method of operation by allocating at least two channels in each frame to the channel unit 20, 21 that communicates with the program amplifier 10, 11.

As shown in FIG. 3, the channel unit 20 includes a 2B1Q transceiver 22 that communicates over the tip and ring (T and R) conductors of the two-wire pair 30 connected to the program amplifier 10. This transceiver provides two-way translation of the 2B1Q signals from the program amplifier into PCM data compatible with the channel bank 40 and the T1 carrier 50. Glue logic 25 provides buffering for the PCM data and timing information between the 2B1Q transceiver 22 and the backplane of the channel bank 40.

The channel unit 20 also includes a controller 23 (e.g., a microprocessor) to monitor and control operation of the channel unit. The controller 13 uses a number of LED's to provide a visible indication of the status of the channel unit and any error conditions. The controller is also employed to generate test tones over the T1 and R1 connectors.

The timing and framing information for the program amplifier 10 is effectively derived by back-propagation from the channel bank 40 at the central office. The TP3410 transceiver available from National Semiconductor can be employed, for example, as the 2B1Q transceiver 12 and 22 in both the program amplifier 10 shown in FIG. 2 and in the channel unit 20 shown in FIG. 3. The 2B1Q transceivers in both the program amplifier 10 and the channel unit 20 see the whole frame of 193 bits. The TP3410 device has an integral channel assigner on board to control which channel(s) in each frame are used for communication. The TP3410 device can operate in either master or slave mode. In the master mode, the transceiver originates framing and master clock signals. In slave mode, an external source delivers the framing and master clock signals to the transceiver. The TP3410 device then phase locks the master clock to its main clock.

The 2B1Q transceiver 22 in the channel unit 10 operates in slave mode. The glue logic 25 derives the channel timing information from the electrical signals carried on the backplane of the channel bank 40. Once decoded, this information is delivered to the 2B1Q transceiver 22 which uses this information as its framing input signal. The master clock from the channel bank backplane is also buffered and then delivered to the 2B1Q transceiver 22 through the glue logic 25. This gives the 2B1Q transceiver all the information necessary for its internal channel assigner to be able to use the assigned channels in each frame In the preferred embodiment, 2B1Q transceiver uses two adjacent channels in each frame. However, additional channels could be used for greater bandwidth.

In contrast, the 2B1Q transceiver 12 in the program amplifier 10 operates in master mode. It derives and delivers the master clock and framing signals to its internal channel assigner. The controller 13 also talks to the channel assigner. The channel assigner in the 2B1Q transceiver 12 then delivers two framing signals through the glue logic 15 to the codec 14 during each frame. This effectively causes the codec 14 to sample the input analog signal at a rate of 16 KHz. The resulting PCM data is delivered to the 2B1Q transceiver where it is translated into 2B1Q line coding and inserted into the appropriate channels in the frame. It should be understood that the 2B1Q transceivers 12 and 22 in the program amplifier 10 and the channel unit 20 remain effectively synchronized to enable two-way communication of frames of data between the transceivers. Therefore, the timing and information for both transceivers is ultimately controlled through back-propagation of framing by the master clock of the channel bank 40.

It should be noted that this embodiment provides an audio bandwidth of approximately 50-7500 Hz for two-way communication over a conventional POTS (plain old telephone service) line. This is close to an AP3 bandwidth (50-8000 Hz). In contrast, a POTS line can typically be expected to deliver an AP0 (300-2500 Hz) or AP1 (200-3500 Hz) bandwidth. An AP3 bandwidth normally requires a dedicated conditioned line, and is typically implemented as a four-wire link if full-duplex communication is required. For example, radio stations often wish to broadcast high fidelity audio programming from a remote location, such as live concert or a sports event. Heretofore, the conventional solution has been for the radio station to contract with the local telephone company to install a dedicated conditioned line between the remote location and the radio station. This can be very expensive to install and operate. It is also subject to the availability of conditioned lines and the vagaries of scheduling by telephone company personnel.

Embodiment for 50-15,000 Hz Bandwidth

Figure 6:
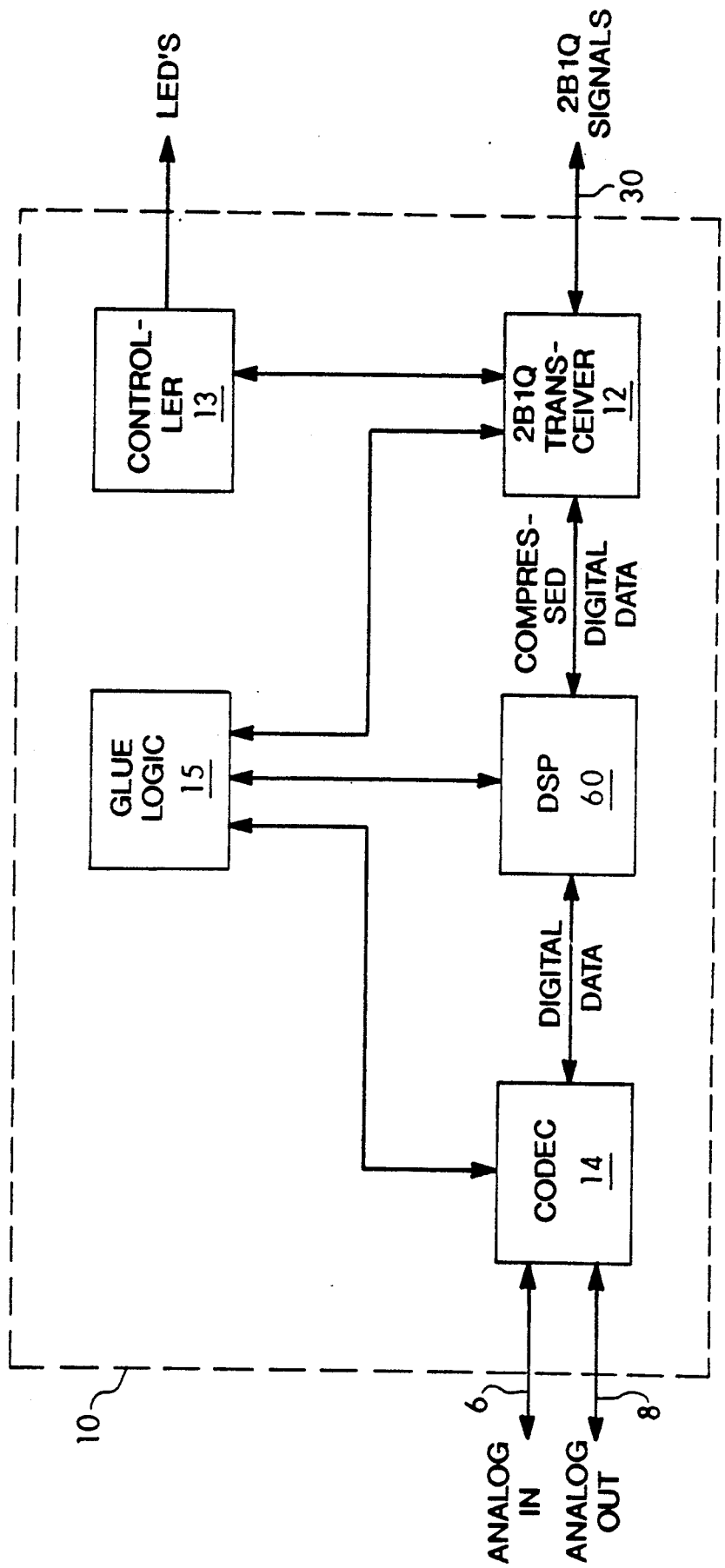
FIG. 6 is a schematic block diagram of an alternative embodiment of the program amplifier 10.

FIG. 6 shows a block diagram of an alternative embodiment of the program amplifier 10 (and 11) that allows a wider audio bandwidth from 50-15,000 Hz. As before, the codec 14 provides two-way conversion of an analog signal into corresponding digital data. To provide greater resolution, the codec 14 in this embodiment produces a 16 bit digital signal at each sample. A sampling rate of 48 KHz is typical, which results in a data rate of 768 kbit/sec. A digital signal processor (DSP) 60 communicates digital data with the codec 14 and provides low-pass filtering in the digital domain. This eliminates the need for the analog low-pass filters 16 and 17 in the first embodiment shown in FIG. 2. The DSP 60 compresses the digital data received from the codec 14 using any of a number of conventional compression algorithms, such as the MPEG standard. For example, the MPEG algorithm can be implemented to result in a fixed 3:1 compression ratio. The compressed digital data is forwarded by the DSP 60 to the 2B1Q transceiver 12 where it is converted to 2B1Q format and transmitted to the central office, as before. The DSP 60 also decompresses digital data received from the 2B1Q transceiver before it is forwarded to the codec 14.

For example, with a 3:1 compression ratio and companding, the DSP 60 compresses the 768 kbit/sec data received from the codec 14 to 128 kbit/sec. In turn, the 2B1Q transceiver converts the compressed digital data into a quaternary stream with a data rate of 128 kbit/sec. The 2B1Q data stream is forwarded to the channel unit 20 at the first central office where it is transmitted over the T1 carrier 50 using a plurality of channels in each frame. The process is reversed at the far end of the T1 link. The channel unit 21 in the channel bank 41 at the second central office receives the data from the designated channels in each frame and converts it to 2B1Q format, as before. The channel unit 21 transmits these 2B1Q signals to the program amplifier 11 at the station, where the 2B1Q transceiver 12 of the program amplifier 11 converts the 2B1Q signals back into compressed digital data. The DSP 60 decompresses the digital data using the MPEG standard, provides low-pass filtering in the digital domain, and forwards the uncompressed digital data to the codec 14 where it is converted back into an analog audio signal.

Installation and Testing. The present system greatly simplifies installation and testing. A number of test features are present when the program amplifier 10 is first turned on and before the unit achieves synchronization with the channel unit 20. A "not ready" LED flashes to let the installer know that the unit is powered. Also, any signals injected into the transmit-in port of the program amplifier will be looped back by the 2B1Q transceiver 12 to the receive-out port. This helps the installer check out virtually the entire program amplifier for functionality. Once the program amplifier has reached synchronization with the channel unit, these test functions automatically go away.

The channel unit 20 provides a number of test functions. When the channel unit is first plugged in, a "not ready" LED flashes to let the installer know that the unit is powered. A pulsed 874 Hz tone will also be heard on the T1 and R1 leads to indicate the status of the channel unit to a person remotely monitoring the system. Once the channel unit has gained synchronization with the program amplifier, the "not read" LED will go out and the green "sync" LED will come on. Also at this time, if there are not T1 alarms, the channel unit will output a pulsed ramp-up tone on the T1 and R1 leads to provide an indication to a person remotely monitoring the unit that the channel unit is properly functioning. The ramp-up tone lasts about five seconds and reoccurs every thirty seconds. If there is an alarm on the local T1 carrier system, the channel unit outputs a pulsed 1748 Hz tone on the T1 and R1 leads as an indication that some sort of carrier failure has occurred.

The present system also greatly simplifies initial adjustment. The present invention is in effect a digital pipe transport system, and thus is not susceptible to most impairments common to analog systems. There are no equalization settings. Unless the circuit requirements call for something other than 0 db in to get 0 db out, there is no need for level settings either. However, the receive path in the program amplifier 10 does include an output amplifier 19 with adjustable gain to provide the option of gain/loss settings.

The above disclosure sets forth a number of embodiments of the present invention. Other arrangements or embodiments, not precisely set forth, could be practiced under the teachings of the present invention and as set forth in the following claims.

I claim:

1. A system for full-duplex wideband audio telephone communications comprising:
  a first program amplifier for two-way communication of analog audio signals at a remote site over a two-wire link, said first program amplifier having:
    (a) a codec for two-way conversion of said analog audio signals into and from corresponding digital signals; and
    (b) a 2B1Q transceiver for two-way conversion of said digital signals into and from corresponding 2B1Q signals;
  a first central office having a channel bank with a plurality of channel units, at least one of said channel units having a 2B1Q transceiver for communicating said 2B1Q signals with said 2B1Q transceiver of said first program amplifier over said two-wire link, said 2B1Q transceiver further providing two-way conversion of said 2B1Q signals into and from corresponding digital signals compatible with said channel bank;

a second central office having a channel bank with a plurality of channel units, at least one of said channel units having a 2B1Q transceiver to provide two-way conversion of digital signals into and from corresponding 2B1Q signals;

a second program amplifier for two-way communication of 2B1Q signals over a two-wire link with said second central office, said second program amplifier having:
(a) a 2B1Q transceiver for communicating with said 2B1Q signals with said 2B1Q transceiver of said second central office over said two-wire link, and for two-way conversion of said 2B1Q signals into and from corresponding digital signals; and
(b) a codec for two-way conversion of said digital signals into and from corresponding analog audio signals; and a carrier link transmitting digital signals between said channel bank of said first central office and said channel bank of said second central office in a series of frames transmitted at a predetermined rate, each frame containing a predetermined number of channels each containing a predetermined number o data bits, wherein said program amplifiers transmit said 2B1Q signals to said central office channel units at a rate generating said digital data sufficient to fill a plurality of said channels in each frame.

2. The system of claim 1 wherein said carrier link is a T1 carrier.

3. The system of claim 1, wherein said program amplifiers transmit said 2B1Q signals to said central office channel units at a rate sufficient to fill two channels in each frame.

4. The system of claim 1, wherein said digital signals in said program amplifiers are PCM signals.

5. The system of claim 1, wherein said program amplifiers further comprise a digital signal processor for compression and decompression of said digital signals between said codec and said 2B1Q transceiver.

6. The system of claim 5, wherein said digital signal processor further provide low-pass filtering of said digital signals.

7. The system of claim 1, wherein operation of said codec and said 2B1Q transceiver of said program amplifiers is synchronized by said central office channel banks.

8. A system for full-duplex wideband audio telephone communications comprising:
a carrier link;
a first central office having a channel bank with a plurality of channel units, capable of communicating digital data over said carrier link with a remote channel bank in a series of frames transmitted at a predetermined rate with each frame containing a predetermined number of channels and each channel containing a predetermined number of data bits, at least one of said channel units having a 2B1Q transceiver for communicating 2B1Q signals with a remote 2B1Q transceiver over a two-wire link, said 2B1Q transceiver further providing two-way conversion of said 2B1Q signals into and from corresponding digital data in a plurality of said channels in each frame;

a second central office having a channel bank for communicating said digital data with said first central office over said carrier link, said channel bank having a plurality of channel units with at least one of said channel units having a 2B1Q transceiver to provide two-way conversion of digital data in a plurality of said channels in each frame into and from corresponding 2B1Q signals and for communicating said 2B1Q signals over a two wire link with a remote 2B1Q transceiver;

a first program amplifier having:
(a) a 2B1Q transceiver for communicating said 2B1Q signals with said 2B1Q transceiver of said first central office over a two-wire link, and for two-way conversion of said 2B1Q signals into and from corresponding digital data; and
(b) a codec for two-way conversion of said digital data into and from corresponding analog audio signals; and a second program amplifier having:
(a) a 2B1Q transceiver for communicating said 2B1Q signals with said 2B1Q transceiver of said second central office over a two-wire link, and for two-way conversion of said 2B1Q signals into and from corresponding digital data; and
(b) a codec for two-way conversion of said digital data into and from corresponding analog audio signals.

9. The system of claim 8, wherein said carrier link is a T1 carrier.

10. The system of claim 8, wherein said program amplifiers transmit said 2B1Q signals to said central office channel units at a rate sufficient to fill two channels in each frame.

11. The system of claim 8, wherein said program amplifiers further comprise a digital signal processor for compression and decompression of said digital signals between said codec and said 2B1Q transceiver.

12. The system of claim 11, wherein said digital signal processor further provide low-pass filtering of said digital signals.

13. The system of claim 8, wherein operation of said codec and said 2B1Q transceiver of said program amplifiers is synchronized by said central office channel banks.

14. A system for full-duplex wideband audio telephone communications comprising:
a carrier link;
a first central office having a channel bank with a plurality of channel units, capable of communicating digital data over said carrier link with a remote channel bank in a series of frames transmitted at a predetermined rate with each frame containing a predetermined number of channels and each channel containing a predetermined number of data bits, at least one of said channel units having a 2B1Q transceiver for communicating 2B1Q signals with a remote 2B1Q transceiver over a two-wire link at a rate synchronized by said channel bank and for two-way conversion of said 2B1Q signals into and from corresponding digital data in a plurality of said channels in each frame;

a second central office having a channel bank for communicating said digital data with said first central office over said carrier link, said channel bank having a plurality of channel units with at least one of said channel units having a 2B1Q transceiver to provide two-way conversion of digital data in a plurality of said channels in each frame into and from corresponding 2B1Q signals, and for communicating said 2B1Q signals with a remote 2B1Q transceiver over a two-wire link at a rate synchronized by said channel bank;

a first program amplifier having:
  (a) a 2B1Q transceiver for communicating said 2B1Q signals with said 2B1Q transceiver of said first central office over a two-wire link, and for two-way conversion of said 2B1Q signals into and from corresponding digital data based on timing information derived from said first central office; and
  (b) a codec for two-way conversion of said digital data into and from corresponding analog audio signals based on timing information derived from said first central office; and a second program amplifier having:
  (a) a 2B1Q transceiver for communicating said 2B1Q signals with said 2B1Q transceiver of said second central office over a two-wire link, and for two-way conversion of said 2B1Q signals into and from corresponding digital data based on timing information derived from said second central office; and
  (b) a codec for two-way conversion of said digital data into and from corresponding analog audio signals based on timing information derived from said second central office.

15. The system of claim 14, wherein said carrier link is a T1 carrier.

16. The system of claim 14, wherein said program amplifiers transmit said 2B1Q signals to said central office channel units at a rate sufficient to fill two channels in each frame.

17. The system of claim 14, wherein said program amplifier further comprises a digital signal processor for compression and decompression of said digital signals between said codec and said 2B1Q transceiver.

18. The system of claim 17, wherein said digital signal processor further provide low-pass filtering of said digital signals.

* * * * *